United States Patent [19]

Ruhl

[11] Patent Number: 4,773,788

[45] Date of Patent: Sep. 27, 1988

[54] SAFETY STRAP ASSEMBLY FOR MOLDS AND DIE CAST DIES

[75] Inventor: Edward A. Ruhl, Southfield, Mich.

[73] Assignee: Kadem Tech. Associates, Ltd., Windsor, Canada

[21] Appl. No.: 53,799

[22] Filed: May 26, 1987

[51] Int. Cl.⁴ .............................................. F16D 1/00
[52] U.S. Cl. .................................... 403/24; 403/303; 403/405.1; 403/348
[58] Field of Search ................ 403/403, 405.1, 407.1, 403/402, 303, 306, 300, 24, 348; 292/300, 304

[56] References Cited

U.S. PATENT DOCUMENTS

| 1,691,676 | 11/1928 | Smith | 292/300 X |
| 2,647,294 | 8/1953 | Davis | 292/304 X |
| 4,515,037 | 5/1985 | Block | 403/348 X |

FOREIGN PATENT DOCUMENTS

| 298171 | 6/1932 | Italy | 292/304 |
| 36883 | 6/1914 | Sweden | 403/402 |
| 87114 | 8/1936 | Sweden | 292/304 |

Primary Examiner—Andrew V. Kundrat
Attorney, Agent, or Firm—Cullen, Sloman, Cantor, Grauer, Scott & Rutherford

[57] ABSTRACT

A safety strap assembly for removably interconnecting a pair of engaging molds for a plastic molding or die cast die for retaining the molds against accidental separation and wherein a pair of laterally spaced shoulder bolts are secured to the molds respectively. A strap assembly comprises a locking plate spanning the dies and having a pair of spaced apertures terminating in keyhole slots adapted to receive the shoulder bolts and the bolts retainingly engaging the locking plate when in locking position. The locking plate is rotatable to an unlocked position disengaging the shoulder bolts from the locking plate. A locating cover overlies and pivotally mounted upon the locking plate and has a pair of spaced apertures receiving the shoulder bolts. The locking plate is rotatable relative to the locating cover until its apertures are in registry with the shoulder bolts.

10 Claims, 3 Drawing Sheets

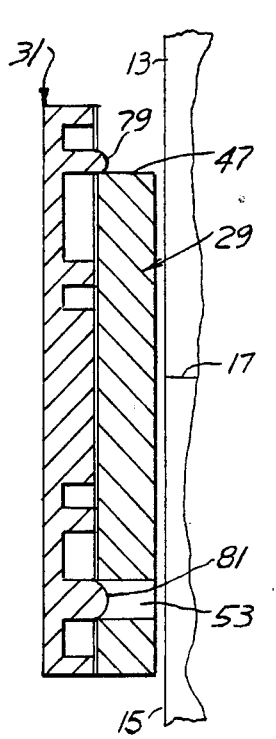
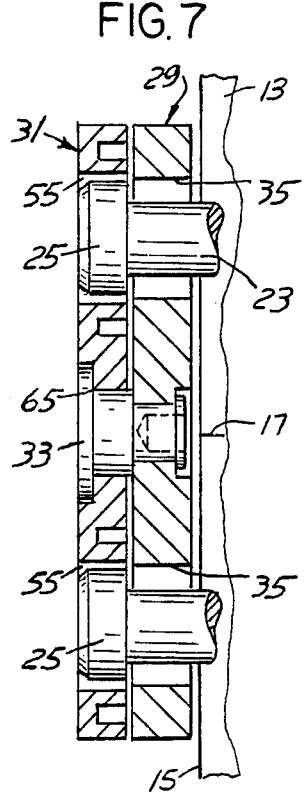
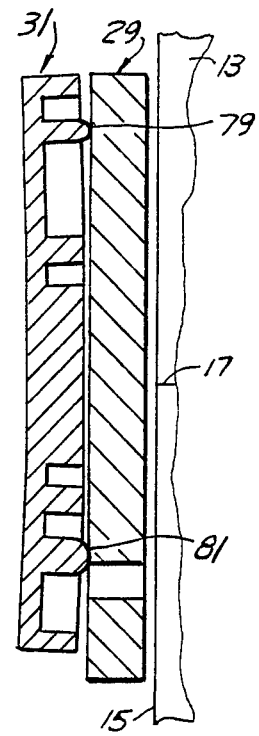
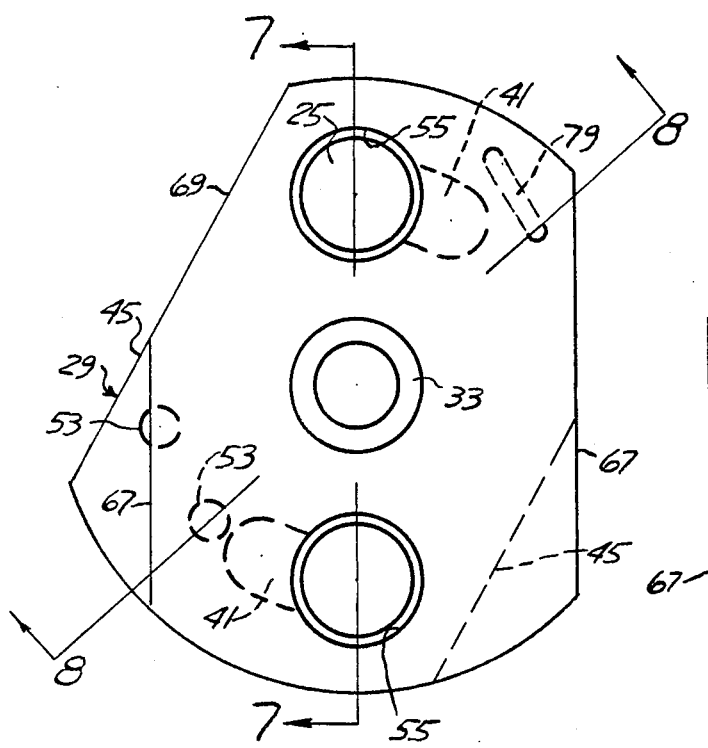
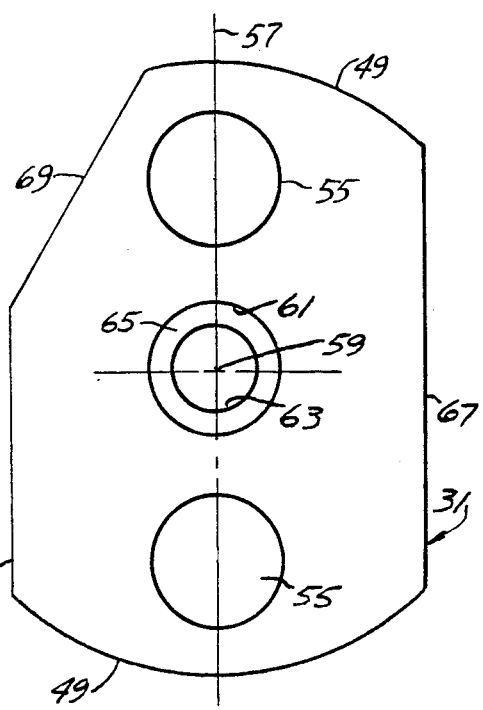

FIG. 11
FIG. 10
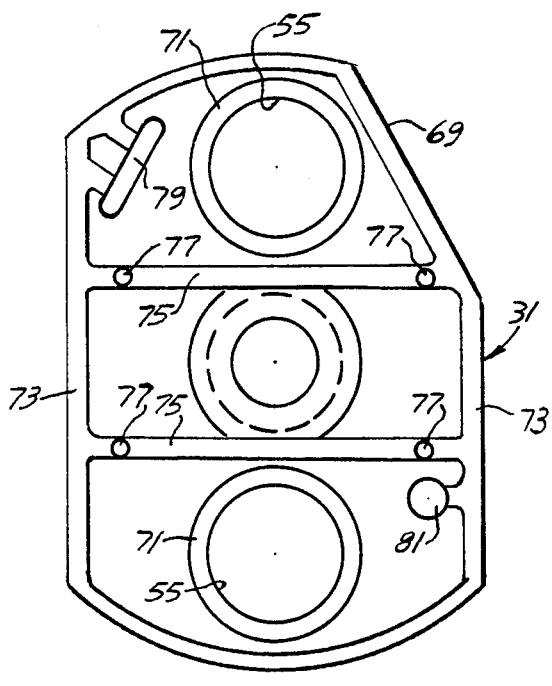
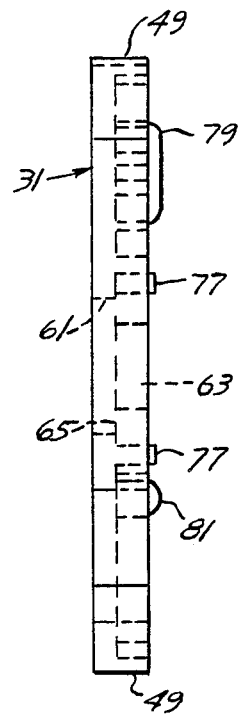
FIG. 12
FIG. 13
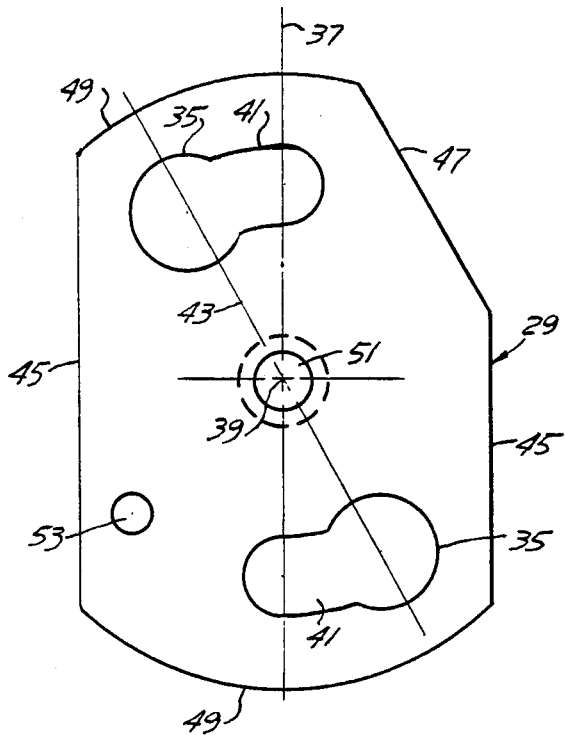
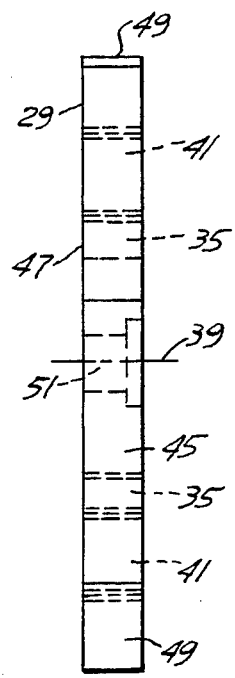

SAFETY STRAP ASSEMBLY FOR MOLDS AND DIE CAST DIES

FIELD OF INVENTION

The present invention relates to the registering molds of a plastic mold or die cast die and particularly to a removable safety strap for retaining the molds against accidental separation.

BACKGROUND OF THE INVENTION

Heretofore in the use of plastic mold assemblies and die cast dies various safety straps have heretofore been employed for securing the dies together at their parting line against accidental separation such as when the dies are transported in a factory or shipped and wherein it is essential that the respective dies stay together in an assembled relationship.

Heretofore various types of safety strap assemblies have been employed primarily employing fasteners and an apertured strap by which the respective adjacent molds may be secured together against accidental separation at the parting line.

Heretofore one of the difficulties with safety straps has been the necessity of removing one or both of the bolts in order to remove the straps which are normally mounted upon opposite sides of the respective engaging molds or dies.

Various types of safety straas have heretofore been employed. In normal use straps are not standardized and vary in design so that there is a wide range of attachment bolt types with the result that bolts and straps become intermingled on the factory floor. This frequently results in failure to use the safety straps as they should be used for normal safety.

SUMMARY OF THE INVENTION

An important feature of the present invention is to provide an improved safety strap assembly for removably interconnecting a pair of engaging molds for a plastic molding or die cast die for retaining the molds against accidental separation.

An important feature is to provide upon the respective molds a pair of laterally spaced shoulder bolts which are threaded into and secured upon said molds and remain secured thereto at all times, and not be removed for disengagement of the safety strap.

The present safety strap assembly includes an elongated metallic locking plate adapted to extend between and bear against a pair of adjacent mold assemblies at their parting line. Said plate has a pair of spaced apertures therethrough with each aperture terminating in an arcuate keyhole slot, receiving the shoulder bolts respectively. The shoulder bolt retainingly engages the locking plate and the locking plate retainingly engages the shoulder bolts and connected molds in a locking position against separation.

As another feature the locking plate may be rotated to an unlocked position aligning the spaced apertures with the shoulder bolts for disengaging said shoulder bolts from the locking plate and wherein the locking plate is removable from the shoulder bolts.

An important feature is to provide for each shoulder bolt a cylindrical shoulder which terminates in an enlarged head and wherein the threaded shank of the shoulder bolt is projected into a bored and tapped aperture in the corresponding molds and fixly secured thereto. Keyhole slots on the apertures are adapted to cooperatively receive the cylindrical shoulders of the shoulder bolts and the enlarged heads thereof are adapted to retainingly engage the locking plate when in a locking position.

An important feature is to apply to the locking plate an elongated locating cover which overlies the locking plate and is rotatively and pivotally connected thereto and which has a pair of spaced apertures therethrough in registry with and receiving the shoulder bolts and wherein the locking plate is rotatable relative to the locating cover when rotated to unlocking position. The locking plate apertures are in registry with the cover apertures.

An important feature includes a pivotal connection for the locking plate with respect to the locating cover and wherein a rivet extends through retainingly engages the cover, extends through and retainingly engages the locking plate.

As an important feature the locating cover is constructed of a plastic material and is flexible and includes undersurface portions which lie in a plane in engaging registry with the locking plate. Detent means project from the cover outwardly of said plane normally in registry with recessed portions of the locking plate when the locking plate is in a locking position. Said detent means on rotation of the locking plate to an unlocking position, operatively engage the locking plate under stress deflecting portions of the locating cover into increased frictional engagement with the locking plate for retaining the locking plate in unlocked position relative to said cover to facilitate reassembly of the safety strap assembly over the shoulder bolts.

As a further feature projected outwardly from the plane of the undersurface of the locating plate are a pair of diametrically opposed detents which are in registry with apertures in the locking plate when the locking plate is in a locking position but when rotated to an unlocked position are in operative stress condition with respect to the locking plate for increased frictional engagement therewith for retaining the locking plate in unlocked position relative to the locating cover.

An important feature provides for an additional shoulder bolt mounted upon one of the adjacent dies at a corresponding spacing of the first shoulder bolts and wherein after the safety strap assembly has been separated from the first shoulder bolts when in an unlocked position, said safety strap assembly may be reassembled over the adjacent pair of shoulder bolts upon one of the dies and thereafter the locking plate rotated to a locking position for anchoring the safety strap assembly upon one of said dies during separation of the said dies and to prevent separation of the safety strap assembly therefrom.

These and other objects and features will be seen from the following specification and claims in conjunction with the appended drawings.

THE DRAWINGS

FIG. 5 is sectional view taken in the direction of arrow 5—5 of FIG. 3.

FIG. 6 is a front elevational view of the safety strap assembly in an unlocked position.

FIG. 7 is a vertical section taken in the direction of arrows 7—7 of FIG. 6, with portions of the adjacent molds in section.

FIG. 8 is a sectional view taken in the direction of arrows 8—8 of FIG. 6.

FIG. 9 is a front view of the locating cover shown in FIG. 3.

FIG. 10 is a right side elevational view thereof.

FIG. 11 is a rear elevational view of the locating cover shown in FIG. 9.

FIG. 12 is a plan view of the locking plate shown in FIGS. 2 and 3.

FIG. 13 is a side elevational view thereof.

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Figure 1:
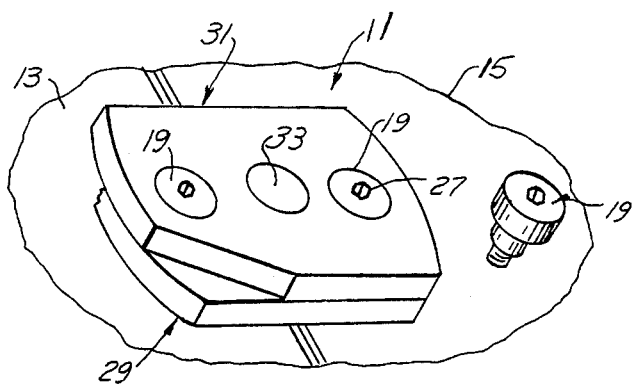
FIG. 1 is a front perspective view of the present safety strap assembly as spanning and interconnecting a pair of adjacent molds fragmentarily shown.
Figure 2:
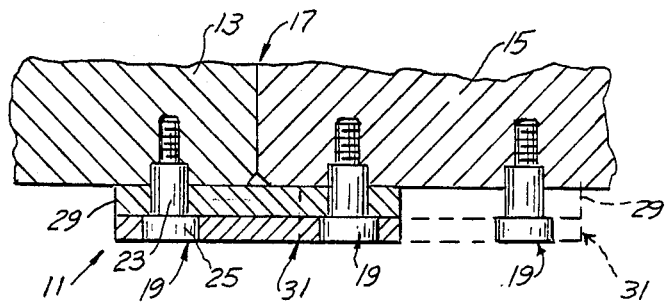
FIG. 2 is a fragmentary plan view thereof with the molds shown in section.

Referring to the drawings FIGS. 1 and 2 the present safety strap assembly is generally indicated at 11 for interconnecting the adjacent contacting molds 13 and 15 for a plastic mold or die cast die. The respective molds 13 and 15 are in engagement side by side along a vertical parting line 17, for illustration, and a pair of laterally spaced shoulder bolts 19 are threaded into or otherwise secured to the respective molds 13 and 15 over which the present safety strap assembly 11 is assembled and secured.

Figure 3:
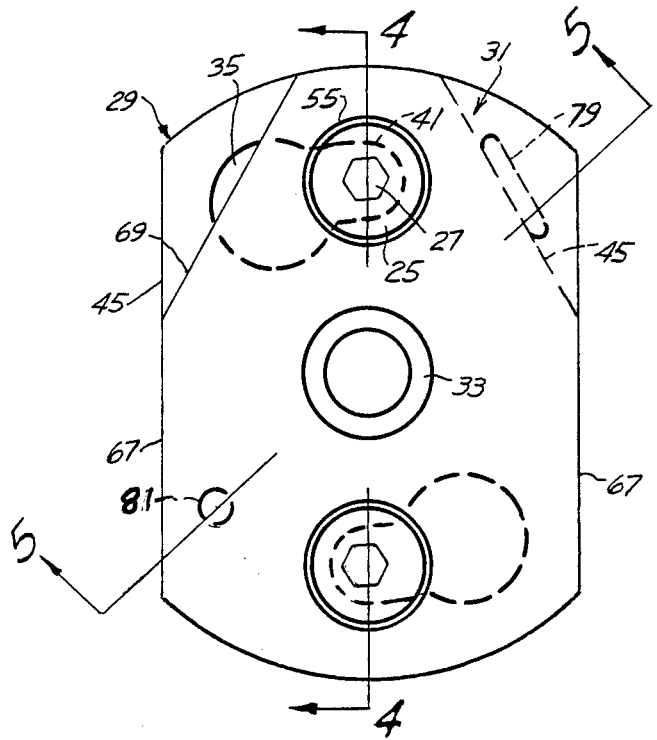
FIG. 3 is a front elevational view of the safety strap assembly oriented 90 degrees from the normal use position shown in FIG. 2, with the locking plate in a locked position.

With respect to the additional illustrations FIGS. 3 through 13 for convenience of illustration the respective safety strap assembly has been oriented to the upright position such as shown in FIG. 3 with the additional respective views in relation thereto.

Normally speaking, however, shoulder straps are essentially employed between a pair of dies such as the dies 13 and 15 which are arranged side by side at their parting line 17 and are retained against lateral separation by accident such as for transporting in a plant or shipping purposes.

Figure 4:
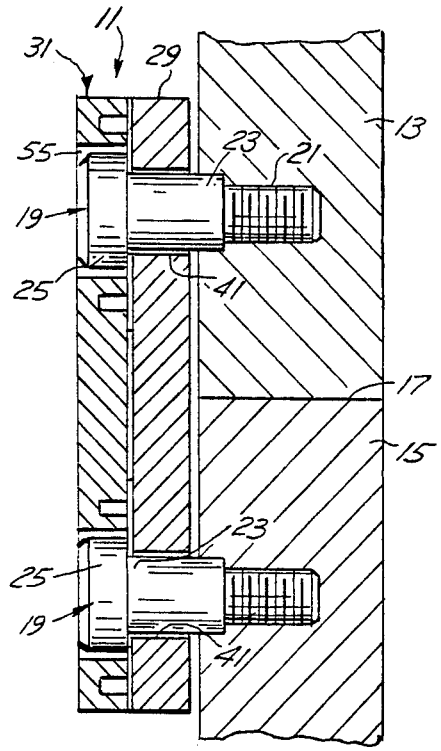
FIG. 4 is a fragmentary section taken in the direction of arrows 4—4 FIG. 3 with portions of the adjacent molds fragmentarily shown and in section.

Shown in FIG. 4 the present shoulder bolt 19 includes a threaded shank 21 which is threaded into a drilled and tapped aperture within the corresponding molds 13 and 15 and a portion of the cylindrical shoulder 23 is snugly nested within a counterbore within the molds with a major portion of the cylindrical shoulder projecting outwardly of the molds and received by locking plate 29.

Each of the shoulder bolts includes a head 25 at its outer end of increased diameter with respect to shoulder 23 and wherein there is an axially arranged Allen socket 27.

The present safety strap assembly includes the elongated metallic locking plate 29, preferably steel, and over which is superimposed the locating cover 31 of a plastic material. Said cover is pivotably connected centrally to locking plate 29 by rivet 33, which extends through and retainingly engages the locating cover and extends through and retainingly engages an undersurface portion of the locking plate, FIG. 7.

Referring to FIGS. 12 and 13 the elongated locking plate 29 includes a pair of diametrically spaced apertures 35 with a diameter greater than shoulder bolt head 25 and extends upon a radius 43 arranged at an angle of 30 degrees with respect to the central axis 37.

The center 39 of locking plate 29 is arranged along central axis 37 and provides a center for the opposed keyhole slots 41 which provide arcuate extensions of the respective apertures 35 adjacent opposite ends of locking plate 29. The corresponding radius 43 for apertures 35 as well as the keyhole slots 41 extends along an axis in the illustrative embodiment at 30 degrees with respect to central axis 37.

Locking plate 29 has a pair of opposed parallel sides 45 with one of the sides terminating in tapered edge 47, which in the illustrative embodiment is inclined at a 30 degree angle with respect to central axis 37 or the corresponding straight side 45. Tapered edge 47 provides a detent clearance in the assembly shown in FIG. 3 relative to detent 79. The respective arcuate ends 49 are equidistant from center 39 through which is directed rivet aperture 51. Diametrically opposed to detent clearance tapered edge 47 there is provided through locking plate 29 detent aperture 53.

The locating 31 cover shown in assembly FIGS. 3 and 6 with respect to locking plate 29 is separately illustrated in FIGS. 9, 10 and 11. Said cover includes a pair of centrally arranged spaced apertures 55 of a diameter greater than heads 25 of shoulder bolts 19. Said apertures are arranged along central axis 57 of locating cover 31. Said cover has a center at 59 through which extends bore 61 and counter bore 63 defining the intermediate shoulder 65. Said shoulder is adapted to supportably receive rivet 33 for projection therethrough as in FIG. 7. Locating cover 31 has a pair of opposed parallel straight sides 67 equidistant from central axis 57 with one of the sides terminating in the inwardly tapered edge 69, which in the illustrative embodiment extends at an angle of 30 degrees with respect to axis 57.

The locating cover 31 is of a molded plastic material and as shown in FIG. 11 includes as extensions of apertures 55 the parallel sleeves 71. Their outer ends are coplanar with the peripheral flange 73 and the transverse ribs 75.

Spaced outwardly of the plane which includes the outer surface of flange 73, the ribs 75 and sleeves 71 are a plurality of interference spacer bosses 77. These are shown in FIG. 10 as projecting outwardly of said plane adapted for cooperative registry with the adjacent surface of the locking plate when assemblied FIGS. 3 through 8.

At one end of the underside of locating cover 31, FIGS. 10 and 11, there is provided a first detent 79 which projects outwardly of the plane of peripheral flange 73, sleeves 71 and ribs 75. In the locking position of the safety strap assembly FIG. 1, said detent is in registry with the corresponding tapered surface 45 FIGS. 3 and 5.

Diametrically opposed to first detent 79 upon the undersurface of locating cover 31 is a second detent 81 which projects outwardly of said plane. In the locking position of the safety strap assembly, FIG. 3, detent 81 is in registry with the corresponding detent aperture 53 in locking plate FIGS. 3 and 12.

The safety strap assembly 11 has a locking position, FIGS. 3 and 4 wherein locking plate 29 is so rotated that the respective keyhole slots 41 cooperatively receive the corresponding cylindrical shoulders 23 of shoulder bolts 19. At the same time the corresponding heads 25 of said shoulder bolts retainingly engage locking plate 29. Said heads extend outwardly and are enclosed within corresponding apertures 55 of locating plate 31. In the illustrative embodiment and regardless of whether the safety strap assembly is in a locking position, FIG. 3, or nonlocking position FIG. 6, locating plate 31 remains in the relative upright position shown. In order to change the locking plate 29 from the locking position, FIG. 3, to the unlocked position FIG. 6, the underlying locking plate 29 is manually rotated clockwise so that the corresponding shoulder bolts 19 are in registry with apertures 35 of the locking plate FIG. 7, so that the corresponding shoulder bolts no longer retainingly engage said locking plate. The corresponding apertures 55 of the locating plate remain in registry with the shoulder bolts so that in the unlocked position the safety strap assembly is easily removable from the corresponding shoulder bolts 19.

In the locked condition of the safety strap assembly 11 and particularly with respect to the locking plate 29, FIG. 4, the respective cylindrical shoulders 23 are retainingly nested within the corresponding keyhole slots 41. The locking plate is effective to restrain the corresponding dies 13 and 15 against separation with respect to parting line 17, FIG. 4. FIG. 4 further illustrates the anchoring and hold down effect of the heads 25 of the shoulder bolts upon portions of the locking plate.

Even without the use of locating plate 31 the locking plate could be manally rotated clockwise from the position shown in FIG. 3 to the position shown in FIG. 6. This would be sufficient rotation that the shoulder bolts would be in registry with the enlarged apertures 35 of the locking plate so that the locking plate could be lifted off the shoulder bolts.

In the locking position of locking plate with respect to locating plate 31, FIG. 5, detent 79 upon the underside of the locating plate is in clearance registry with the corresponding tapered surface 47 of the locking plate. At the same time the second detent 81, FIGS. 10 and 11, is in registry with corresponding detent recess 53 within the locking plate.

This changes when the locking plate has been rotted to the unlocked position in FIGS. 6, 7 and 8.

With the locking plate rotated 30 degrees, for illustration, the corresponding apertures 35 are in registry with shoulder bolts 19. The corresponding detent 79 is now placed under stress against the top surface of locking plate 29. Also the corresponding depending detent 81 is stressed against the top surface of the locking plate. Since the locating plate is plastic and of a flexible material it is stressed and bent slightly, though exaggerated in FIG. 8, to establish additional frictional engagement of the locating plate with respect to the locking plate. This is for the purpose of retaining the locking plate 29 in its angular unlocked position with respect to the locating plate with the corresponding apertures 35 and 55 in registry. As soon as it is necessary to reassemble the safety strap assembly 11 back on to the shoulder bolts the apertures will easily receive such shoulder bolts. In the unlocked condition of the safety strap assembly, FIG. 7, the corresponding heads 25 of the shoulder bolts are in registry with apertures 35 of the locking plate and no longer retainingly engage the locking plate so that it can be manually separated from the shoulder bolts.

In the illustrative embodiment, in FIG. 2, there is provided upon one of the molds 15 an additional shoulder bolt 19 spaced from the adjacent shoulder bolt 19 a distance equal to the spacing between the first shoulder bolts 19 on the respective molds 13 and 15.

This is for permitting removal of the safety strap assembly when in an unlocked position and reassembly as shown in dotted lines of the same safety strap assembly upon the two shoulder bolts 19 upon one of the dies 15 FIG. 1. The locking plate 29 may be rotated 30 degrees, for illustration, counter clockwise from the position shown in FIG. 6 so as to create an interlock of the locking plate with the adjacent pair of shoulder bolts 19 upon the single die 15. This provides a means for anchoring the safety strap assembly upon one of the dies, such as die 15, after the safety strap has been removed from its connection between the respective dies.

Having described my invention reference should now be had to the following claims.

I claim:

1. A safety strap assembly for removably interconnecting a pair of engaging molds for a plastic molding or diecast die for retaining the molds against accidental separation;
    a pair of laterally spaced shoulder bolts threaded into and secured respectively to said molds;
    said strap assembly comprising an elongated metallic locking plate spanning and bearing against said molds, and having a pair of spaced apertures therethrough, with each aperture terminating in an arcuate keyhole slot, receiving said shoulder bolts respectively;
    and with said shoulder bolts retainingly engaging said locking plate, and with said locking plate retainingly engaging said shoulder bolts and connected molds in a locking position;
    said locking plate being rotatable to an unlocked position aligning said spaced apertures with said shoulder bolts, disengaging said shoulder bolts from said locking plate;
    said locking plate being removable from said shoulder bolts.

2. In the safety strap assembly of claim 1, each shoulder bolt having a cylindrical shoulder terminating in an enlarged head;
    said apertures having a diameter greater than said shoulder bolt heads, said shoulders being nested within said keyhole slots;
    said heads retainingly engaging said locking plate when in locking position.

3. In the safety strap assembly of claim 1, an elongated locating cover overlying said locking plate with said locking plate rotatively and pivotally connected to said cover;
    said cover having a pair of spaced apertures therethrough in registry with and receiving said shoulder bolts, said locking plate being rotatable relative to said locating cover when rotated to unlocking position with its apertures in registry with the cover apertures.

4. In the safety strap assembly of claim 3, the pivotal connection of said locking plate to said locating cover including a rivet extending through and retainingly engaging said cover, extending through and retaining and engaging said locking plate.

5. In the safety strap assembly of claim 3, said locking cover being constructed of a plastic material and flexible;

undersurface portions of said locating cover lying in a plane and in engaging registry with said locking plate;

and detent means projecting from said cover outward of said plane in registry with recessed portions of said locking plate when in locking position;

said detent means on rotation of said locking plate to unlocking position operatively engaging said locking plate under stress deflecting portion of said cover into increased frictional engagement therewith for retaining said locking plate in unlocked position relative to said cover to facilitate reassembly over said shoulder bolts.

6. In the safety strap assembly of claim 5, said detent means including a pair of spaced diametrically opposed detents, one detent being in registry with an aperture in said locking plate and the other detent being in registry with a cut away portion of said locking plate when in locking position.

7. In the safety strap assembly of claim 3, said locking plate and locating cover having opposed registering parallel sides and registering arcuate ends respectively equidistant from the centers of said locking plate and locating cover, said plate and cover being pivotally connected at said centers, with said arcuate ends maintained in registry at locking and unlocking positions of said locking plate.

8. In the safety strap assembly of claim 3, said locking plate and locator cover having opposed registering parallel sides equidistant from the center of said plate and cover, said plate and cover being pivotally connected at said centers;

one corner of said locating cover having an edge tapered at a 30 degree angle towards the central axis of said cover whereby when said locking plate is rotated to unlocked position its adjacent edge is in registry with said tapered edge, and the apertures of said locking plate are in registry with said shoulder bolts.

9. In the safety strap assembly of claim 1, there being an additional laterally spaced shoulder bolt upon one of said molds at the same spacing as said first pair of shoulder bolts, said safety strap assembly when removed from said pair of shoulder bolts being positionable over the pair of shoulder bolts including said additional shoulder bolt, said locking plate being rotatable to a locking position with the corresponding keyhole slots receiving said shoulder bolts.

10. In the safety strap assembly of claim 3, there being an additional laterally spaced shoulder bolt upon one of said molds at the same spacing as said pair of shoulder bolts;

said safety strap assembly when removed from said pair of shoulder bolts being positionable over the pair of shoulder bolts including said additional shoulder bolt;

said locking plate being rotatable to a locking position with the corresponding keyhole slots receiving said shoulder bolts.

* * * * *